US012446619B2

(12) United States Patent
Bialek et al.

(10) Patent No.: US 12,446,619 B2
(45) Date of Patent: Oct. 21, 2025

(54) AEROSOL-GENERATING DEVICE AND A METHOD OF GENERATING A MIXED AEROSOL

(71) Applicant: Philip Morris Products S.A., Neuchatel (CH)

(72) Inventors: Jakub Bialek, Neuchatel (CH); Robert Emmett, Neuchatel (CH); Ana Isabel Gonzalez Florez, Neuchatel (CH); Jean-Pierre Schaller, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 764 days.

(21) Appl. No.: 17/634,225

(22) PCT Filed: Jul. 28, 2020

(86) PCT No.: PCT/EP2020/071282
§ 371 (c)(1),
(2) Date: Feb. 9, 2022

(87) PCT Pub. No.: WO2021/028217
PCT Pub. Date: Feb. 18, 2021

(65) Prior Publication Data

US 2022/0273031 A1 Sep. 1, 2022

(30) Foreign Application Priority Data

Aug. 14, 2019 (EP) .................................... 19191844

(51) Int. Cl.
*A24F 40/30* (2020.01)
*A24F 40/05* (2020.01)
(Continued)

(52) U.S. Cl.
CPC .............. *A24F 40/30* (2020.01); *A24F 40/05* (2020.01); *A24F 40/10* (2020.01); *A24F 40/42* (2020.01);
(Continued)

(58) Field of Classification Search
None
See application file for complete search history.

(56) References Cited

U.S. PATENT DOCUMENTS 5,666,977 A 9/1997 Higgins et al.
2006/0180143 A1 8/2006 Lind et al.
(Continued)

FOREIGN PATENT DOCUMENTS

CA 3049068 A1 * 7/2018 ............ A24F 40/10
CN 101228969 A 7/2008
(Continued)

OTHER PUBLICATIONS

Combined Russian Office Action and Search Report issued Nov. 8, 2023 in Russian Patent Application No. 2022106122/03 (with English Translation), 18 pages.
(Continued)

*Primary Examiner* — Linda L Gray
(74) *Attorney, Agent, or Firm* — Oblon, McClelland, Maier & Neustadt, L.L.P.

(57) ABSTRACT

An aerosol-generating device is provided, including: a first storage portion; a first liquid aerosol-forming substrate contained within the first storage portion; an electrospray device to generate a first aerosol from the first liquid aerosol-forming substrate, the electrospray device including a nozzle to receive the first liquid aerosol-forming substrate from the first storage portion, and a voltage circuit including a circuit ground, the voltage circuit to apply a voltage difference between the first liquid aerosol-forming substrate and the
(Continued)

circuit ground; a second storage portion; a second liquid aerosol-forming substrate contained within the second storage portion; a heater to heat second liquid aerosol-forming substrate from the second storage portion; and a mixing chamber in fluid communication with the nozzle and the heater, the heater being downstream of the nozzle. A method of generating a mixed aerosol by the aerosol-generating device is also provided.

16 Claims, 8 Drawing Sheets

(51) Int. Cl.

| | |
|---|---|
| ***A24F 40/10*** | (2020.01) |
| ***A24F 40/42*** | (2020.01) |
| ***A24F 40/46*** | (2020.01) |
| ***A24F 40/48*** | (2020.01) |
| ***B05B 5/025*** | (2006.01) |
| *B05B 5/053* | (2006.01) |

(52) U.S. Cl.

CPC .............. *A24F 40/46* (2020.01); *A24F 40/48* (2020.01); *B05B 5/0255* (2013.01); *B05B 5/0535* (2013.01)

(56) References Cited

U.S. PATENT DOCUMENTS

| | | | | |
|---|---|---|---|---|
| 2010/0314460 | A1 | 12/2010 | Dvorsky et al. | |
| 2012/0048266 | A1 | 3/2012 | Alelov | |
| 2014/0123989 | A1 | 5/2014 | LaMothe | |
| 2015/0251201 | A1 | 9/2015 | Hradetzky et al. | |
| 2017/0020195 | A1 | 1/2017 | Cameron | |
| 2017/0295848 | A1 | 10/2017 | LaMothe | |
| 2018/0132534 | A1 * | 5/2018 | Reevell | A24F 40/485 |
| 2019/0209791 | A1 | 7/2019 | Courbat et al. | |

FOREIGN PATENT DOCUMENTS

| | | | |
|---|---|---|---|
| CN | 207151932 | U | 3/2018 |
| CN | 109803549 | A | 5/2019 |
| EP | 2 892 595 | A0 | 7/2015 |
| JP | 2004-534354 | A | 11/2004 |
| JP | 5041550 82 | | 7/2012 |
| JP | 2017-518032 | A | 7/2017 |
| JP | 2019-98216 | A | 6/2019 |
| KR | 10-2019-0039810 | A | 4/2019 |
| KR | 10-2019-0080273 | A | 7/2019 |
| RU | 2 602 962 | C2 | 11/2016 |
| WO | WO 2013/152873 | A1 | 10/2013 |
| WO | WO 2014/071329 | A1 | 5/2014 |
| WO | WO 2015/079197 | A1 | 6/2015 |
| WO | 2018/069995 | A1 | 4/2018 |
| WO | WO 2019/105812 | A1 | 6/2019 |

OTHER PUBLICATIONS

Extended European Search Report issued Mar. 11, 2022, in corresponding European Patent Application No. 19191844.0, 9 pages.

Dirk Grafahrend et al., "Development and Optimization of an Electrospraying Device for the Continuous Collection of Nano- and Microparticles", The Open Chemical and Biomedical Methods Journal, 2010, 3, pp. 1-9.

Office Action issued Jul. 29, 2024, in corresponding Japanese Patent Application No. 2022-505335 (with English Translation), 4 pages.

International Search Report and Written Opinion issued on Oct. 21, 2020 in PCT/EP2020/071282 filed Jul. 28, 2020, 13 pages.

Korean Notice of Allowance issued Mar. 24, 2025 in Korean Patent Application No. 10-2022-7004679 (with English Translation), 4 pages.

Korean Office Action issued Dec. 24, 2024, in corresponding Korean Patent Application No. 10-2022-7004679 (with English Translation), 10 pages.

Combined Chinese Office Action and Search Report issued Jan. 25, 2025, in corresponding Chinese Patent Application No. 202080052756.4 (with English Translation), 31 pages.

Chinese Office Action Issued May 10, 2025 in corresponding Chinese Patent Application No. 202080052756.4. with English Translation, 33 pages, citing document 15 therein.

* cited by examiner

AEROSOL-GENERATING DEVICE AND A METHOD OF GENERATING A MIXED AEROSOL

The present invention relates to an aerosol-generating device and a method of generating a mixed aerosol.

Devices for generating aerosols for inhalation by a user are known in the art. Such devices typically produce an aerosol by heating a liquid aerosol-forming substrate until the liquid aerosol-forming substrate vaporises into an aerosol. Such devices typically include a storage portion or reservoir for holding a supply of the liquid aerosol-forming substrate, or "e-liquid", and a heater for heating the e-liquid to generate the aerosol.

Typical aerosol-generating devices heat liquid aerosol-forming substrates to high temperatures of between 200 degrees Celsius and 350 degrees Celsius to vaporise the aerosol-forming substrate. However, heating liquid aerosol-forming substrates to such high temperatures can result in the thermal degradation of compounds within the liquid aerosol-forming substrate. Thermal degradation of compounds within the liquid aerosol-forming substrate may adversely affect the aerosol delivered to a user.

It would be desirable to provide an aerosol-generating device that reduces or eliminates the risk of thermal degradation of a liquid aerosol-forming substrate.

There is provided an aerosol-generating device. The aerosol-generating device may comprise a first storage portion. The aerosol-generating device may comprise a first liquid aerosol-forming substrate. The first liquid aerosol-forming substrate may be contained within the first storage portion. The aerosol-generating device may comprise a nozzle. The nozzle may be arranged to receive first liquid aerosol-forming substrate from the first storage portion. The aerosol-generating device may comprise a second storage portion. The aerosol-generating device may comprise a second liquid aerosol-forming substrate. The second liquid aerosol-forming substrate may be contained within the second storage portion. The aerosol-generating device may comprise a voltage circuit. The voltage circuit may comprise a circuit ground. The voltage circuit may be arranged to apply a voltage difference between the first liquid aerosol-forming substrate and the circuit ground. The aerosol-generating device may comprise a heater. The heater may be arranged to heat second liquid aerosol-forming substrate from the second storage portion. The aerosol-generating device may comprise a mixing chamber. The mixing chamber may be in fluid communication with the nozzle. The mixing chamber may be in fluid communication with the heater.

There is also provided an aerosol-generating device comprising: a first storage portion; a first liquid aerosol-forming substrate contained within the first storage portion; a nozzle arranged to receive first liquid aerosol-forming substrate from the first storage portion; a second storage portion; a second liquid aerosol-forming substrate contained within the second storage portion; a voltage circuit comprising a circuit ground, the voltage circuit being arranged to apply a voltage difference between the first liquid aerosol-forming substrate and the circuit ground; a heater arranged to heat second liquid aerosol-forming substrate from the second storage portion; and a mixing chamber in fluid communication with the nozzle and the heater.

There is also provided an aerosol-generating device comprising: a first storage portion; a first liquid aerosol-forming substrate contained within the first storage portion; a nozzle arranged to receive first liquid aerosol-forming substrate from the first storage portion; a second storage portion; a second liquid aerosol-forming substrate contained within the second storage portion; an electrospray device arranged to disperse first liquid aerosol-forming substrate from the first storage portion; a heater arranged to heat second liquid aerosol-forming substrate from the second storage portion; and a mixing chamber in fluid communication with the nozzle and the heater. The electrospray device may comprise a voltage circuit. The voltage circuit may comprise a circuit ground. The voltage circuit may be arranged to apply a voltage difference between the first liquid aerosol-forming substrate and the circuit ground.

As used herein, the term "aerosol-forming substrate" relates to a substrate capable of releasing volatile compounds that can form an aerosol. Such volatile compounds may be released by heating the aerosol-forming substrate or other aerosolising means. A suitable substrate could be in liquid form, such as an e-liquid.

Advantageously, the aerosol-generating device defined above may generate an aerosol from the first liquid aerosol-forming substrate by means of non-thermal vaporisation (for example, by electrospray). Use of non-thermal vaporisation reduces or eliminates the risk of thermal degradation of compounds in the first liquid aerosol-forming substrate. Specifically, the present inventors have recognised that the risk of thermally degrading compounds within a liquid aerosol-forming substrate may be reduced or eliminated by reducing or eliminating the application of thermal energy during an aerosolisation process. The present inventors have further recognised that the reduction or elimination of thermal energy during an aerosolisation process may be achieved by using an aerosolisation process such as electrohydrodynamic atomisation, also known as electrospray. Electrospray uses Coulomb repulsion to break up and disperse a liquid into droplets in the nanometer and micrometer range. This may also be referred to as nebulizing the liquid.

In some examples, the first liquid aerosol-forming substrate can include aerosol compounds that are more susceptible to thermal degradation, and the second liquid aerosol-forming substrate can include aerosol compounds that are less susceptible to thermal degradation. For example, the first liquid aerosol-forming substrate may comprise at least one of glycerol and propylene glycol, and the second liquid aerosol-forming substrate may comprise at least one of water, triethyl citrate, and a flavourant. In an example, the first liquid aerosol-forming substrate may be a dielectric material.

During use of the aerosol-generating device, the first liquid aerosol-forming substrate is aerosolised into a first aerosol by using the voltage circuit, and the second liquid aerosol-forming substrate is aerosolised into a second aerosol by using the heater. The first and second aerosols can be combined into a mixed aerosol and the mixed aerosol may then be inhaled by a user. Advantageously, use of two different vaporisation techniques in combination allows the aerosol-generating device to generate a large volume of the mixed aerosol.

Advantageously, the non-thermal vaporisation of the first liquid aerosol-forming substrate by the aerosol-generating device facilitates the generation of an aerosol having droplet sizes of about 400 nanometres or less. Advantageously, droplet sizes of about 400 nanometres or less may facilitate pulmonary delivery of the aerosol to a user.

In an example, the nozzle comprises a capillary tube in fluid communication with the first storage portion. The capillary tube may comprise a first portion and a second portion. The first portion may comprise a first end and a second end. The first end of the first portion may be in fluid communication with the first storage portion. The second portion may extend from the second end of the first portion. The first portion of the capillary tube may be longer than the second portion of the capillary tube. The second portion of the capillary tube may be disposed at an angle with respect to the first portion of the capillary tube. The second portion of the capillary tube may be disposed at an angle of between about 45 degrees and about 135 degrees with respect to the first portion of the capillary tube. The second portion of the capillary tube may be disposed at an angle of about 90 degrees with respect to the first portion of the capillary tube. An advantage of providing the second portion of the capillary tube at an angle with respect to the first portion of the capillary tube is that it may result in increased mixing of a first aerosol generated from the first liquid aerosol-forming substrate with a second aerosol generated from the second liquid aerosol-forming substrate.

The capillary tube may have a length of between about 5 millimetres and about 5 centimetres. The capillary tube may have a length of about 3 centimetres.

The capillary tube may have a thickness of between about 18 gauge and about 33 gauge.

The capillary tube may be formed from any suitable material. In embodiments in which the voltage circuit is arranged to apply a voltage to the capillary tube, preferably the capillary tube is formed from an electrically conductive material. The capillary tube may be formed from at least one of aluminium and stainless steel.

In an example, the voltage circuit comprises a voltage terminal electrically connected to at least one of the first storage portion and the nozzle. The voltage circuit may be arranged to apply a voltage to the voltage terminal. The voltage circuit may be arranged to apply a voltage difference between the voltage terminal and the circuit ground.

In an example, the voltage circuit comprises a substrate voltage terminal in contact with the first liquid aerosol-forming substrate. The voltage circuit may be arranged to apply a voltage difference between the substrate voltage terminal and the circuit ground.

The circuit ground may be a separate element. The circuit ground may be the second storage portion. The circuit ground may be a counter electrode. The counter electrode may be oriented to be perpendicular to nozzle. The counter electrode may be oriented to be perpendicular to capillary tube. The counter electrode may be provided downstream of the nozzle. The circuit ground may be a power supply. The circuit ground may be a battery. The circuit ground may be a cathode of a battery.

Advantageously, during use, the voltage circuit charges or ionises droplets of the first aerosol generated from the first liquid aerosol-forming substrate. Once the droplets are charged, repulsive forces are generated within the charged droplets. The electrostatic charges of each liquid particle within each droplet repel each other, and the surface tension acting on the outer surface of each droplet hold the droplet together. The larger a droplet is, the more liquid particles there are contained within the droplet, and the more repulsive electrostatic forces there are within the droplet once the droplet is charged. At what is known as the Rayleigh Limit, the internal repulsive forces overcome the surface tension forces and the droplet breaks apart into multiple smaller droplets. This process is known as Coulomb fission.

Preferably, the voltage circuit is arranged to apply a voltage difference of between about 1 kilovolt and about 20 kilovolts.

In an example, the aerosol-generating device comprises at least one of a mesh and a perforated plate positioned downstream of the nozzle. The perforated plate may positioned downstream of the nozzle. The perforated plate may define a plurality of apertures extending through the perforated plate.

In one example, during use of the aerosol-generating device, aerosol produced from the first liquid aerosol-forming substrate may pass through the perforated plate before it can be inhaled by a user. Advantageously, any droplets of the first aerosol that are larger than the apertures in the perforated plate are prevented from passing through the perforated plate. Therefore, advantageously, the perforated plate may be configured to limit the maximum droplet size of the first aerosol delivered to a user. For example, a droplet of the first aerosol that is larger than an aperture in the perforated plate can be blocked by the plate that defines each aperture.

Advantageously, controlling the maximum droplet size of an aerosol that is generated by the aerosol-generating device allows the perforated plate to facilitate consistent delivery of an aerosol to a user. The consistent droplet size provides a consistent user experience.

In an example, at least one of the mesh and the perforated plate is electrically connected to the voltage circuit. In an example, at least one of the mesh and the perforated plate is electrically connected to the circuit ground.

In an example, the first liquid aerosol-forming substrate comprises at least one of nicotine, glycerol and propylene glycol. The first liquid aerosol-forming substrate may comprise another target compound for delivery to a user.

In an example, the aerosol-generating device comprises a liquid dispensing apparatus to dispense the first liquid aerosol-forming substrate from the first storage portion to the nozzle.

In an example, the mixing chamber is arranged to allow for mixing of aerosol from the nozzle and aerosol from the heater. In an example, the mixing chamber is arranged to allow for mixing of aerosol generated from the first liquid aerosol-forming substrate and aerosol generated from the second liquid aerosol-forming substrate. The mixing chamber may be a cavity that is defined by the shape of a housing. The mixing chamber may be a cavity that is defined by the shape of the heater. During use, the mixing chamber provides a defined space for allowing the first aerosol and the second aerosol to mix.

In an example, the second storage portion comprises a liquid transfer element. Preferably, the second liquid aerosol-forming substrate is sorbed onto the liquid transfer element. The liquid transfer element may comprise at least one of a wick or a capillary tube.

In an example, the aerosol-generating device comprises a power supply arranged to supply electrical power to the voltage circuit and the heater. The voltage circuit may include a voltage boost converter to boost a voltage output from the power supply. The power supply may comprise a battery. The battery may be a rechargeable battery. The battery may be a lithium ion battery. The power supply may comprise another form of charge storage device such as a capacitor. The power supply may require recharging. The power supply may have a capacity that allows for the storage of enough energy for one or more uses of the aerosol-generating device. For example, the power supply may have sufficient capacity to allow for the continuous generation of a mixed aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations. The power supply may comprise a first power supply arranged to supply electrical power to the voltage circuit and a second power supply arranged to supply electrical power to the heater.

In an example, the circuit ground is the power supply. In another example, the circuit ground is the battery.

In an example, the aerosol-generating device is arranged to heat the heater to a temperature of between about 80 degrees Celsius and about 180 degrees Celsius.

Preferably, the heater is an electric heater.

The heater may be a resistive heater.

The heater may be a mesh-type heater.

The heater may be an inductive heater. The aerosol-generating device may further include a susceptor. The inductive heater may be configured to inductively heat the susceptor during use. The inductive heater may be positioned around a portion of the susceptor.

The heater may have a rectangular shape. In some examples, the heater may have a cylindrical shape. Use of a cylindrical shape may allow for a higher flow rate of aerosol.

The heater may be positioned in direct contact with the second storage portion.

The heater may be located in direct contact with the liquid transfer element.

In an example, the second liquid aerosol-forming substrate comprises at least one of water, triethyl citrate, and a flavourant. The second liquid aerosol-forming substrate may comprise another target compound for delivery to a user.

The aerosol-generating device may include a housing.

The aerosol-generating system may comprise one or more air inlets. The aerosol-generating system may comprise a plurality of air inlets. The aerosol-generating system may include one or more air inlets located in the region of the heater. The aerosol-generating system may include one or more air inlets located in the region of the nozzle. The aerosol-generating system may include one or more air inlets located in the region of the voltage circuit.

The aerosol-generating device may include an electrospray device for generating a first aerosol from the first liquid aerosol-forming substrate. The electrospray device may comprise the voltage circuit. The electrospray device may comprise the nozzle. The electrospray device may be configured to charge or ionise droplets of the first liquid aerosol-forming substrate.

The aerosol-generating device may include a removable cartridge. The cartridge may comprise two or more compartments. The removable cartridge may house at least one of the first storage portion and the second storage portion. The removable cartridge may house the first storage portion and the second storage portion.

Some components of the aerosol-generating device may be separable, removable, or single-use and disposable. The aerosol-generating device is configured for use to produce an inhalable mixed aerosol when fully assembled, as further described herein.

The aerosol-generating device may comprise a power supply section and an aerosol-generating section configured for attachment to the power supply section. Preferably, the power supply is positioned in the power supply section. Preferably, the first liquid aerosol-forming substrate and the second liquid aerosol-forming substrate are provided in the aerosol generating section. The aerosol-generating section may comprise a mouthpiece.

There is also provided a method of generating a mixed aerosol. The method may comprise electrospraying a first liquid aerosol-forming substrate to generate a first aerosol. The method may comprise heating a second liquid aerosol-forming substrate to generate a second aerosol. The method may comprise mixing the first aerosol and the second aerosol to generate a mixed aerosol.

There is also provided a method of generating a mixed aerosol, the method comprising: electrospraying a first liquid aerosol-forming substrate to generate a first aerosol; heating a second liquid aerosol-forming substrate to generate a second aerosol; and mixing the first aerosol and the second aerosol to generate a mixed aerosol.

Advantageously, use of two different vaporisation techniques in combination allows the aerosol-generating device to generate a large volume of the mixed aerosol.

Advantageously, electrospraying of the first liquid aerosol-forming substrate by the aerosol-generating device facilitates the generation of an aerosol having droplet sizes of about 400 nanometres or less. Advantageously, droplet sizes of about 400 nanometres or less may facilitate pulmonary delivery of the aerosol to a user.

In an example, electrospraying the first liquid aerosol-forming substrate comprises electrospraying the first liquid aerosol-forming substrate at a voltage of between about 1 kilovolt and about 20 kilovolts.

In an example, heating the second liquid aerosol-forming substrate comprises heating the second liquid aerosol-forming substrate to a temperature of between about 80 degrees Celsius and about 180 degrees Celsius.

The method of generating a mixed aerosol described above may include any of the features of the aerosol-generating device described above.

Specific embodiments will now be described, by way of example only, with reference to the accompanying drawings, in which.

Figure 1:
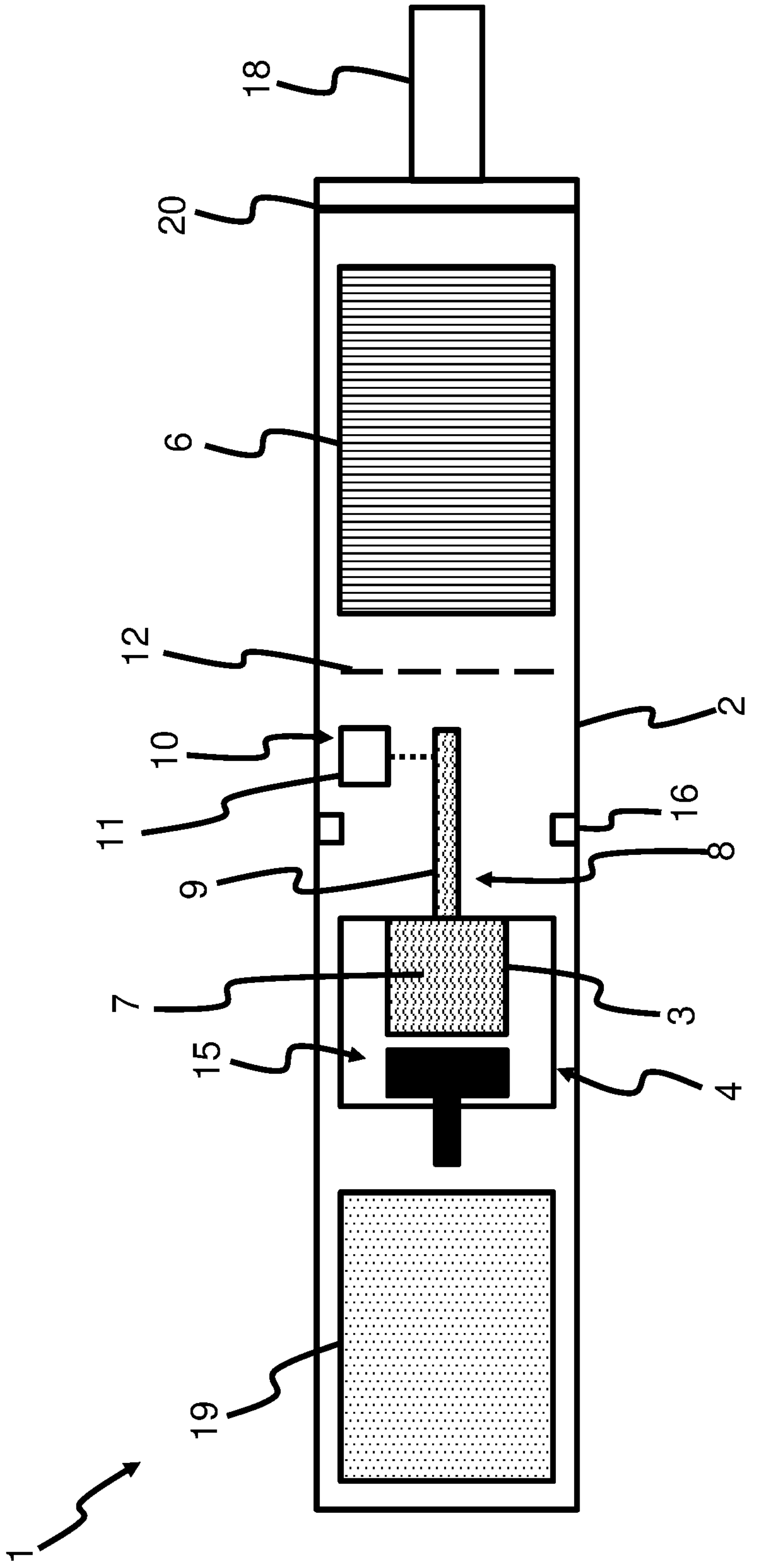
FIG. 1 shows schematically a plan view of a longitudinal cross-section of an aerosol-generating device according to a first embodiment.
Figure 2:
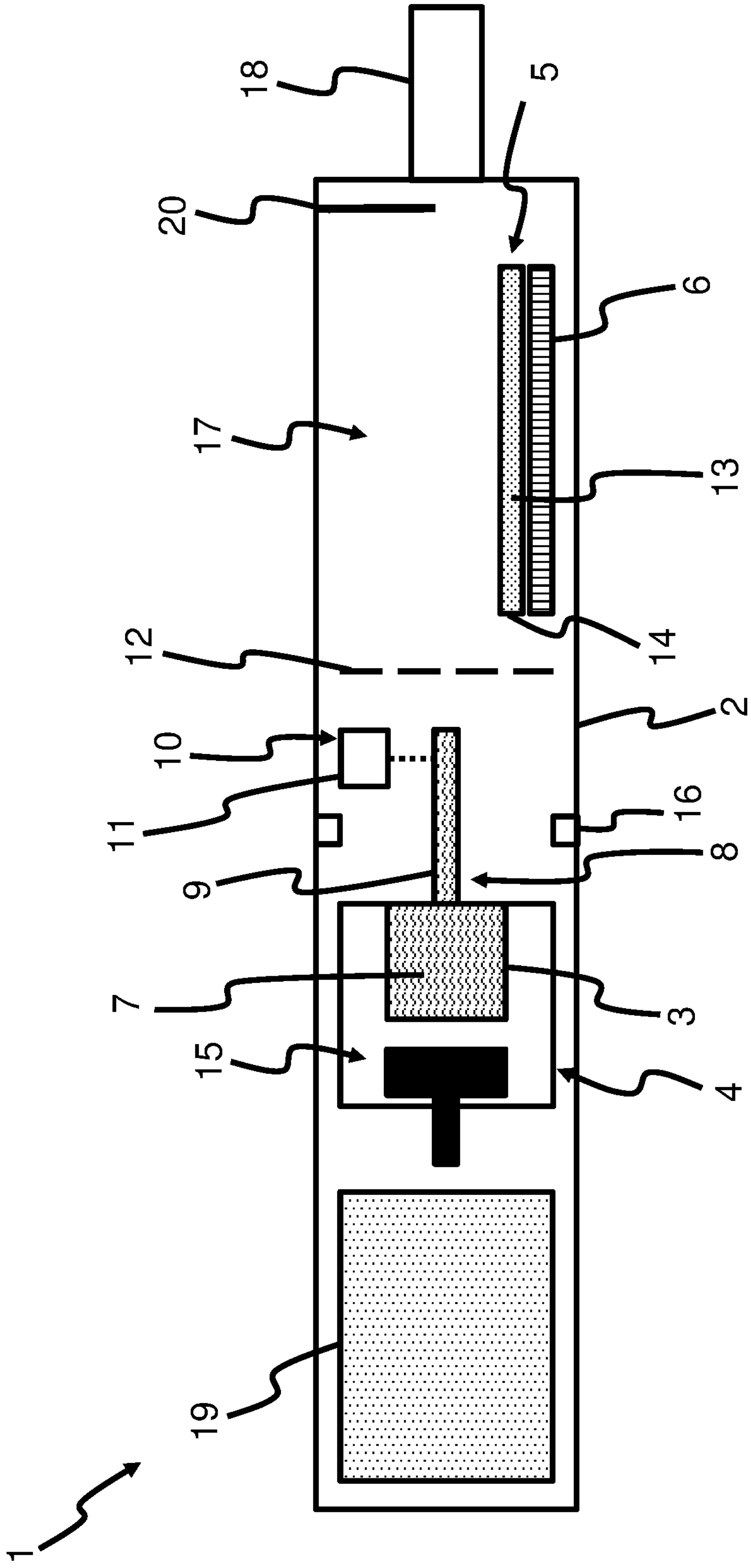
FIG. 2 shows schematically a side view of a longitudinal cross-section of the aerosol-generating device according to the first embodiment.

Referring to FIGS. 1 and 2, there is shown schematically an example of an aerosol-generating device 1 according to a first embodiment. In this example, the aerosol-generating device 1 is an electronic cigarette. In other examples, the aerosol-generating device 1 may be another type of device. The aerosol-generating device 1 has a housing 2. The aerosol-generating device 1 also includes a first storage portion 3, an electrospray device 4, a second storage portion 5 and a heater 6. In this example, the first storage portion 3, the electrospray device 4, the second storage portion 5 and the heater 6 are all located within the housing 2. In another example, one or more of the components may be in provided in a removable cartridge, which is detachable from the housing 2.

The first storage portion 3 is a reservoir containing a supply of a first liquid aerosol-forming substrate 7. In this example, the first storage portion 3 is a simple container. The first liquid aerosol-forming substrate 7 may include any liquid or mixture of liquids that is readily capable of forming an aerosol by, for example, electrospray. For example, the first liquid aerosol-forming substrate 7 may include one or more of nicotine, glycerine and propylene glycol. In this specific example, the first storage portion 3 contains approximately five millilitres of the first liquid aerosol-forming substrate 7.

The electrospray device 4 is constructed and arranged to atomise and disperse the first liquid aerosol-forming substrate 7 contained within the first storage portion 3 from a liquid into a first aerosol. In the example shown in FIGS. 1 and 2, the electrospray device 4 includes a nozzle 8. The nozzle 8 is arranged to receive the first liquid aerosol-forming substrate 7 from the first storage portion 3. In one example, the nozzle 8 includes a capillary tube 9, which is in fluid communication with the first storage portion 3. The capillary tube 9 may have a length of about 3 centimetres.

The electrospray device 4 also includes a voltage circuit 10. The voltage circuit 10 is constructed and arranged to ionise (for example, charge) droplets of the first liquid aerosol-forming substrate 7 as the first liquid aerosol-forming substrate 7 passes through the nozzle 8. Ionising the first liquid aerosol-forming substrate 7 may cause the first liquid aerosol-forming substrate 7 to disperse as an aerosol.

The voltage circuit 10 is arranged to apply a voltage to at least one of the first storage portion 3 and the nozzle 8. Alternatively, in the examples shown in FIGS. 7 and 8 and described below, the voltage circuit 10 is arranged to apply a voltage directly to the first liquid aerosol-forming substrate 7. The voltage circuit 10 may include a voltage terminal 11. In one example, the voltage terminal 11 is a metal wire. In another example, the voltage terminal 11 includes a metal wire. The metal wire may comprise platinum. In the example shown in FIGS. 1 and 2, the voltage terminal 11 is electrically connected to the nozzle 8, specifically to the capillary tube 9. In another example, the voltage terminal 11 may be electrically connected to the first storage portion 3. The voltage circuit 10 is arranged to apply a voltage difference between the voltage terminal 11 and a circuit ground. In this example, the circuit ground is a counter electrode 12, which is a separate dedicated component that is provided specifically to act as the circuit ground. The counter electrode 12 may be oriented to be perpendicular to nozzle 8. The perpendicular orientation of the counter electrode 12 allows for better definition of the electric field. In addition, the perpendicular orientation of the counter electrode 12 also allows the counter electrode 12 to "pull" ionised droplets of the first aerosol out of the nozzle 8. In another example, the circuit ground may be another component of the aerosol-generating device 1, such as the housing 2. The voltage circuit applies a voltage difference of between about 1 kilovolts and about 20 kilovolts between the voltage terminal and the circuit ground.

The electrospray device 4 may produce a wide range of droplet sizes within the generated first aerosol. To homogenise the droplet sizes within the generated aerosol by removing or resizing droplets that are above a desired maximum size, the aerosol-generating device 1 may further comprise a perforated plate. In one example, the perforated plate is positioned between the aerosol nozzle 8 and the mouthpiece 18. During use of the aerosol-generating device 1, the first aerosol that is generated by the electrospray device flows towards the perforated plate. The perforated plate comprises a plurality of apertures extending through the perforated plate. In one example, all of the apertures have the same diameter. The perforated plate is configured to remove or resize droplets with a diameter that is greater than the diameter of the apertures. For example, the perforated plate may include apertures have a diameter of 10 micrometres so that droplets with a diameter that is greater than 10 micrometres are removed or resized. In other words, the perforated plate may be formed from a mesh defining the plurality of apertures.

The second storage portion 5 is a reservoir containing a supply of a second liquid aerosol-forming substrate 13. In the example shown in FIGS. 1 and 2, the second storage portion 5 includes a liquid transfer element 14. The liquid transfer element 14 may act as a wick. The liquid transfer element 14 may be a length of absorbent material or a capillary tube that can transport the second liquid aerosol-forming substrate 13 via capillary action. The second liquid aerosol-forming substrate 13 can be sorbed onto the liquid transfer element 14. In one example, the liquid transfer element 14 is in direct contract with the heater 6. In a specific example, the second storage portion 5 may contain a supply of between about 0.1 millilitres to about 10 millilitres of the second liquid aerosol-forming substrate 13. The second liquid aerosol-forming substrate 13 may include any liquid or mixture of liquids that is readily capable of forming an aerosol by, for example, vaporisation. For example, the second liquid aerosol-forming substrate 13 may include one or more of water, triethyl citrate, and a flavourant.

The heater 6 is constructed and arranged to heat the second liquid aerosol-forming substrate 13 from the second storage portion 5. The heater 6 is arranged to vaporise the second liquid aerosol-forming substrate 13 from a liquid into a second aerosol. The heater 6 may be located in a position within the aerosol-generating device 1 that enhances mixing of the second aerosol with the first aerosol. For example, as is shown in FIGS. 1 and 2, the heater 6 may be located downstream of the nozzle 8. Specifically, the heater is located between the nozzle 8 and a mouthpiece 18. The heater 6 may have a shape that can assist in heating the second liquid aerosol-forming substrate. For instance, in the example shown in FIGS. 1 and 2, the heater 6 has a planar shape. In other examples the heater may have another shape that assists in the heating of the second liquid aerosol-forming substrate 13. The heater 6 may include a heating element. The heating element may be, for example, a resistive heating element, an inductive heating element, or the like. In a specific example, the heater 6 operates at a temperature of between about 80 degrees Celsius and about 180 degrees Celsius.

The aerosol-generating device 1 includes a liquid dispensing apparatus 15. The liquid dispensing apparatus 15 is configured to dispense the first liquid aerosol-forming substrate 7 from the first storage portion 3 to the nozzle 9 of the electrospray device 4. The liquid dispensing apparatus 15 may be any type of liquid moving assembly. In the example shown in FIGS. 1 and 2, the liquid dispensing apparatus 15 is a piston pump. In another example, the liquid dispensing apparatus 15 may be another type of liquid moving assembly, such as a piezoelectric pump, or a pressurised gas tank connected to the first storage portion 3. In a specific example, the liquid dispensing apparatus 15 is configured to dispense the first liquid aerosol-forming substrate 7 from the first storage portion 3 to the nozzle 9 at a flow rate of between about 1 microliter per hour and about 10 microliters per hour. In an example, the liquid dispensing apparatus 15 is configured to dispense the first liquid aerosol-forming substrate 7 through the mesh.

The aerosol-generating device 1 may also include one or more air inlets 16. In the example shown in FIGS. 1 and 2, two air inlets 16 are provided. In another example, another number of air inlets 16 may be provided. The one or more air inlets 16 allow for improved air flow into the housing 2 during use of the aerosol-generating device 1.

In the example of FIGS. 1 and 2, the aerosol-generating device 1 includes a mixing chamber 17. In this example, the mixing chamber 17 is a cavity defined by the housing 2. In another example, the mixing chamber 17 may be a separate compartment formed within the housing 2. The mixing chamber 17 is in fluid communication with the nozzle 8 (or the capillary tube 9) and the heater 6. The mixing chamber 17 provides a space for generating a mixed aerosol by allowing the dispersed first aerosol to mix with the vaporised second aerosol.

A mouthpiece 18 is also provided at one end of the housing 2. In the example of FIGS. 1 and 2, the mouthpiece 18 is in fluid communication with the mixing chamber 17. The mouthpiece 18 allows a user to inhale the mixture of the first aerosol and the second aerosol from the mixing chamber 17.

The aerosol-generating device 1 also includes a power supply 19. The power supply 19 is arranged to supply electrical power to the heater 6 and the voltage circuit 10. The power supply 19 is therefore arranged to supply electrical power to the voltage terminal 11. The voltage circuit 10 may include a voltage boost converter to boost a voltage output from the power supply 19.

The aerosol-generating device 1 may also include a corona discharger 20 for neutralizing the charged first aerosol. The corona discharger may be located in the region of the mouthpiece 18.

Figure 3:
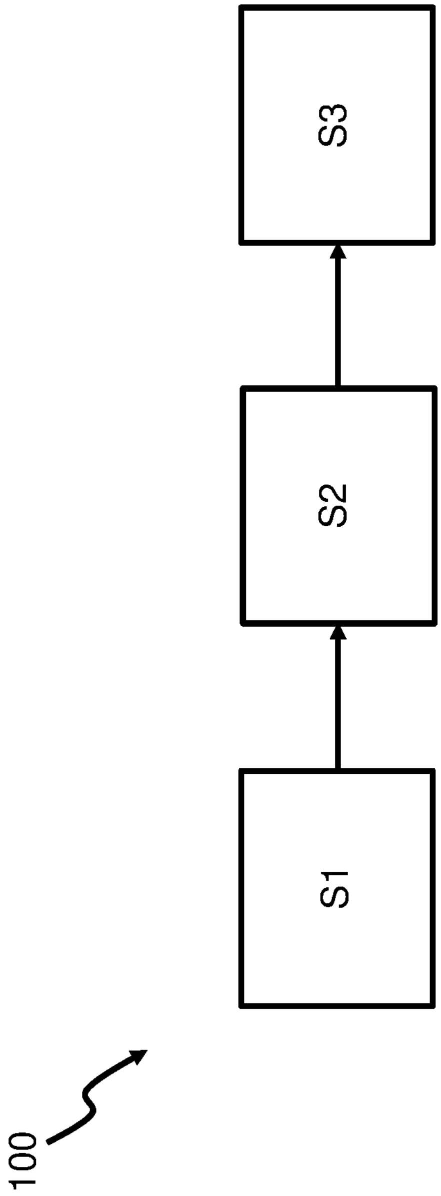
FIG. 3 shows a flow chart of a method of generating a mixed aerosol.

Referring to FIG. 3, there is shown a method 100 of generating a mixed aerosol from the first liquid aerosol-forming substrate 7 and the second liquid aerosol-forming substrate 13. As will be described, the mixed aerosol of the method 100 may be generated, for example, by using the aerosol-generating device 1 shown in FIGS. 1 and 2.

The method 100 may be triggered by a user input. For example, the aerosol-generating device 100 may comprise a user interface arranged to receive a user input. The user interface may comprise at least one of a mechanical switch or button, and a touch button such as a capacitive sensor. The aerosol-generating device 100 may comprise an airflow sensor arranged to sense airflow through the aerosol-generating device 100 when a user draws on the mouthpiece 18. The user input may comprise the user drawing on the mouthpiece 18.

At S1, the electrospray device 4 generates a first aerosol from the first liquid aerosol-forming substrate 7. In the example of FIGS. 1 and 2, the first liquid aerosol-forming substrate 7 includes nicotine, which is susceptible to thermal degradation. The electrospray device 4 generates the first aerosol by ionising and atomising the first liquid aerosol-forming substrate 7.

First, the liquid dispensing apparatus 15 dispenses the first liquid aerosol-forming substrate 7 from the first storage portion 3 and into the nozzle 8. The voltage circuit then applies a voltage difference between the circuit ground and the voltage terminal 11, which is electrically connected to the nozzle 8. This causes the first liquid aerosol-forming substrate 7 in the nozzle 8 to be ionised by the voltage circuit 10. The ionised first liquid aerosol-forming substrate 7 is then ejected out of the capillary tube 9 by the liquid dispensing apparatus 15 and is sprayed into the mixing chamber 17, towards the heater 6. The ionised first liquid aerosol-forming substrate 7 disperses into the mixing chamber 17 as the first aerosol because of Coulomb repulsion between the molecules of the first liquid aerosol-forming substrate 7.

At S2, the heater 6 generates the second aerosol from the second liquid aerosol-forming substrate 13. It will be appreciated that in some examples steps S1 and S2 run concurrently. In the example of FIGS. 1 and 2, the second liquid aerosol-forming substrate 13 includes water and a flavourant.

The heater 6 is activated and its heating element is heated to between 80 degrees Celsius and 180 degrees Celsius. The high temperature of the heater 6 vaporises the second liquid aerosol-forming substrate 13 provided on the liquid transfer element 14 to form the second aerosol. The second aerosol flows into the mixing chamber 17 due to natural convection.

At S3, the first aerosol and the second aerosol mix together to form a mixed aerosol. The first aerosol traverses the mixing chamber 17 when sprayed by the electrospray device 4. The flow of the first aerosol towards the mixing chamber 17 is enhanced as the user puffs through the mouthpiece 18. The puffing action of the user draws air into the housing 2 (for example, through air inlets 16) and in the direction of the mouthpiece 18. As this air is drawn towards the mouthpiece 18, the generated positive pressure assists in carrying the dispersed first aerosol to the mixing chamber 17. The mixed aerosol may then be inhaled through the mouthpiece 18 by the user. In the example shown in FIGS. 1 and 2, the mixed aerosol is first discharged of its ionisation when passing over the corona discharger 20 before entering the mouthpiece 18.

An advantage of the arrangement shown in FIGS. 1, 2 and 3 is that large volumes of the first aerosol can be generated using non-thermal vaporisation (for example, electrospray). Any compounds that are susceptible to thermal degradation (for example, at least one of nicotine, glycerol and propylene glycol) can be provided in the first liquid aerosol-forming substrate 7. Consequently, the above arrangement may allow for generation of a mixed aerosol within the aerosol-generating device without actively heating any compound that is known to be susceptible to thermal degradation.

In addition, the combination of using electrospray to form the first aerosol, and a heater to form the second aerosol, provides for a substantial increase in throughput of the mixed aerosol when compared to use of electrospray only.

Furthermore, the aerosol-generating device 1 is able to generate droplets of the mixed aerosol having a droplet size of about 400 nanometres. Advantageously, this may facilitate pulmonary delivery of the aerosol to a user.

Moreover, less insulating material is required in the housing 2 to protect the user from heat induced damage. With the above arrangement, the heater 6 is operated at relatively lower temperatures of between 80 degrees Celsius and 180 degrees Celsius compared to the much higher temperatures of between 200 degrees Celsius and 350 degrees Celsius used in typical fully thermal aerosol-generating devices. This is because the above aerosol-generating device 1 only thermally vaporises compounds that have a lower volatilisation temperature, such as water, rather than compounds having a higher volatilisation temperature, such as glycerol. Compounds having a higher volatilisation temperature are electrosprayed.

Figure 4:
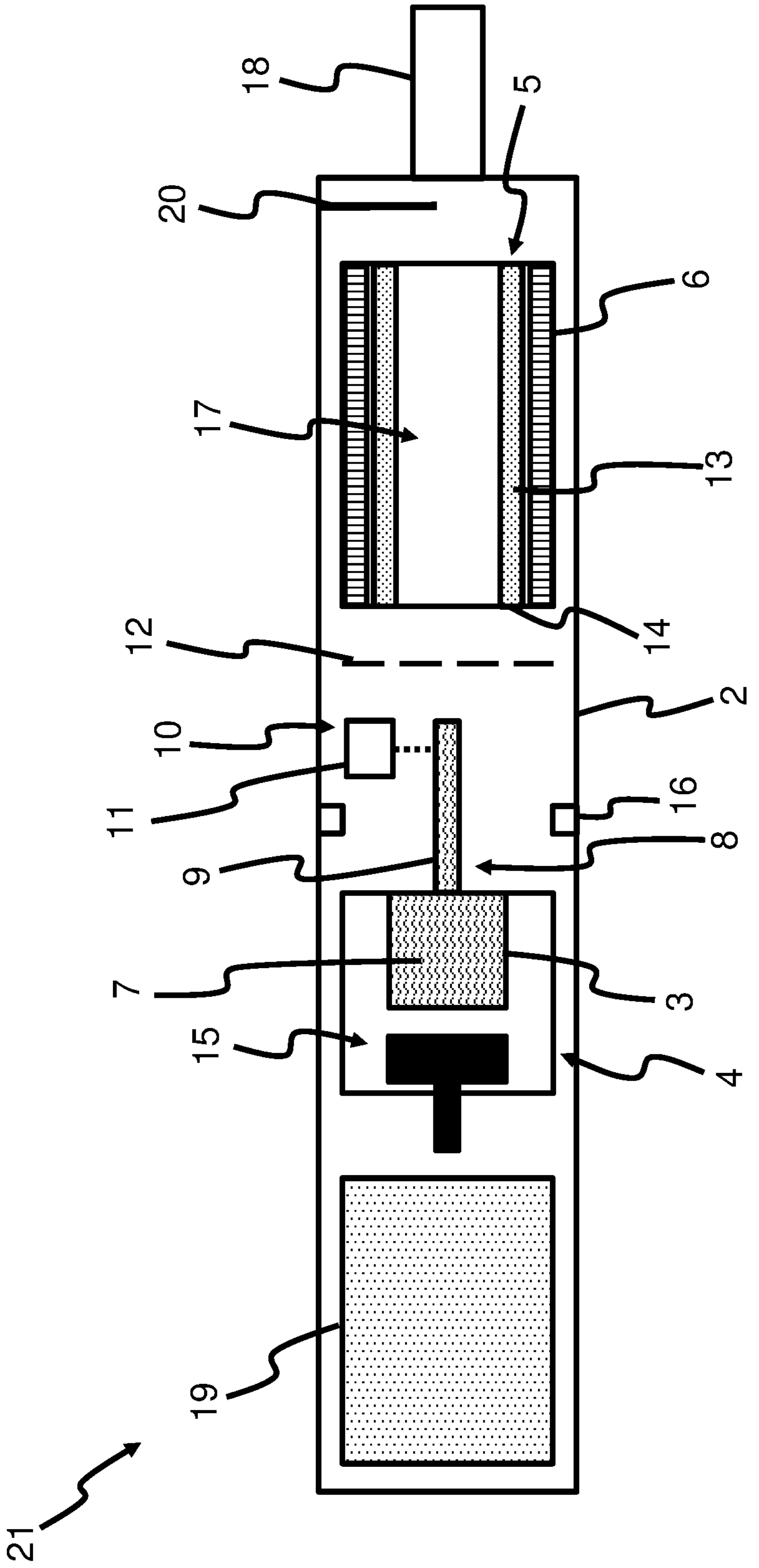
FIG. 4 shows schematically a side view of a longitudinal cross-section of an aerosol-generating device according to a second embodiment.

Referring to FIG. 4, there is shown schematically an example of an aerosol-generating device 21 according to a second embodiment. The second embodiment includes many of the same elements as the first embodiment, such as the housing 2, the first storage portion 3, the electrospray device 4, the second storage portion 5, the heater 6 and the voltage circuit 10. Like reference numerals are used to designate like parts.

In the example according to the second embodiment as shown in FIG. 4, the heater 6 is a cylindrical heater (that is, the heater 6 has a cylindrical tube shape). As a consequence, in the example of FIG. 4, the liquid transfer element 14 also has a corresponding cylindrical shape. The heater 6 and the liquid transfer element 14 may be arranged concentrically. For example, in FIG. 4 the heater 6 is radially outward of the liquid transfer element 14. The arrangement shown in FIG. 4 therefore provides a mixing chamber 17 that is substantially enclosed by the liquid transfer element 14 and the heater 6. In one example, the electrospray device 4 is positioned to eject droplets of the first aerosol towards the centre of the cylindrical heater 6.

With the arrangement shown in FIG. 4, the mixing chamber 17 is enclosed around its circumferential wall by the heater 6 and the liquid transfer element 14. This circular geometry provides for a more compact cloud of the second aerosol within the mixing chamber 17 than is provided by the planar geometry of the first embodiment shown in FIGS. 1 and 2. A more compact cloud of the second aerosol allows the droplets of the first aerosol to mix more efficiently with the second aerosol to form the mixed aerosol. The geometry of the embodiment shown in FIG. 4 also reduces the amount of the second aerosol that is lost through the mouthpiece before it can be mixed with the first aerosol.

Figure 5:
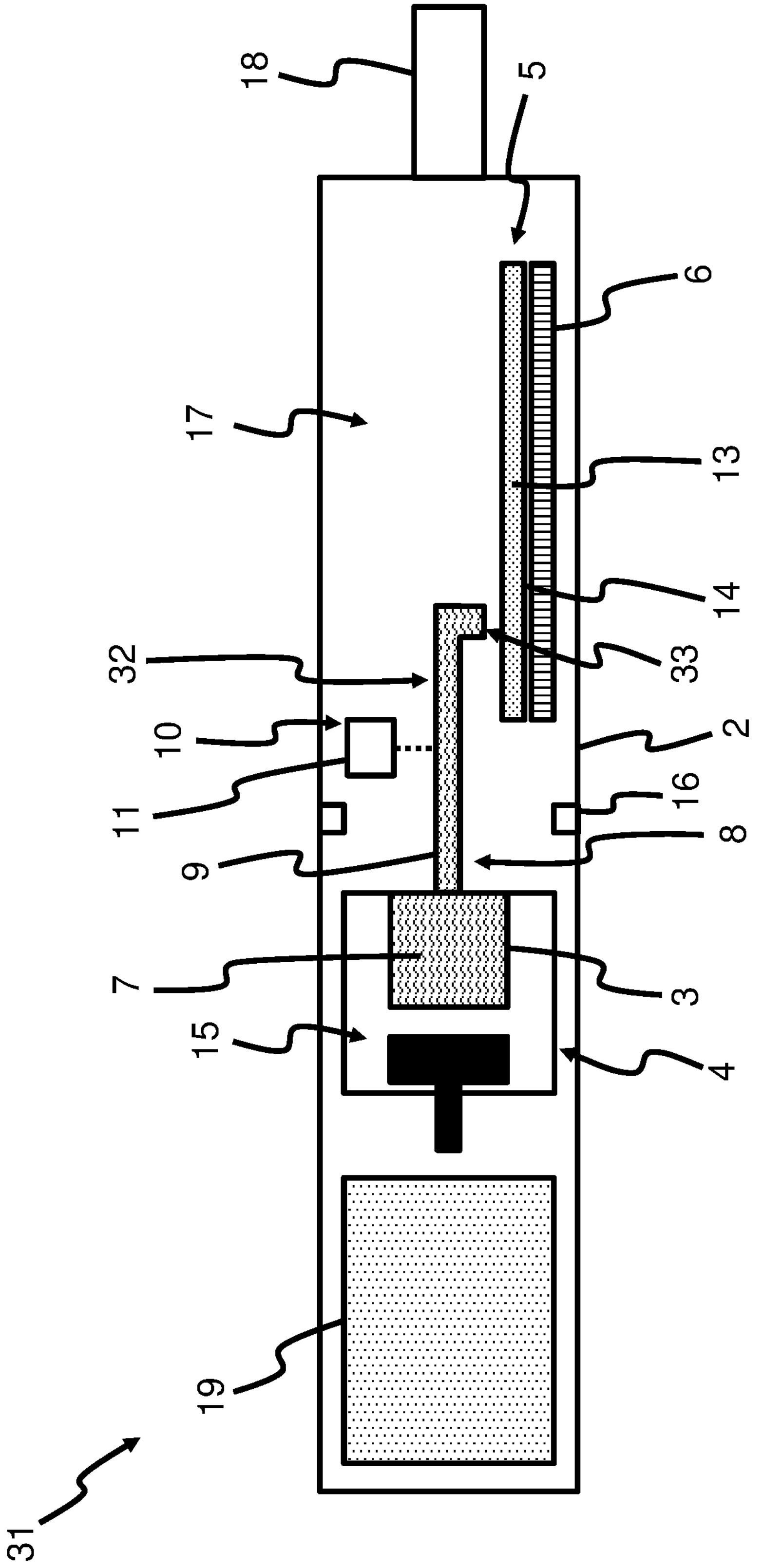
FIG. 5 shows schematically a side view of a longitudinal cross-section of an aerosol-generating device according to a third embodiment.

Referring to FIG. 5, there is shown schematically an example of an aerosol-generating device 31 according to a third embodiment. The third embodiment includes many of the same elements as the first embodiment, such as the housing 2, the first storage portion 3, the electrospray device 4, the second storage portion 5, the heater 6 and the voltage circuit 10. Like reference numerals are used to designate like parts.

In the example according to the third embodiment as shown in FIG. 5, the capillary tube 9 has a first portion 32 and a second portion 33. The capillary tube 9 may be constructed and arranged in a configuration that improves mixing of the first aerosol and the second aerosol. For example, the second portion 33 may be disposed at an angle with respect to the first portion 32. Advantageously, the second portion 33 of the capillary tube 9 may be disposed at an angle of between about 45 degrees and about 135 degrees with respect to the first portion 32 of the capillary tube 9. In the example shown in FIG. 5, the second portion 33 of the capillary tube 9 is disposed at an angle of about 90 degrees with respect to the first portion 32 of the capillary tube 9. In other examples, the second portion 33 of the capillary tube 9 may be disposed at other angles with respect to the first portion 32 of the capillary tube 9.

With the arrangement shown in FIG. 5, the first aerosol is sprayed in a generally opposite direction to the direction that the vaporised second aerosol travels due to natural convection. The first aerosol moving in an opposite direction to the second aerosol causes maximum overlap between the first aerosol and the second aerosol. Therefore, in addition to the above advantages, the arrangement of FIG. 5 provides improved mixing of the first aerosol and the second aerosol in the mixing chamber 17, which results in a more homogenous mixed aerosol. A more homogenous mixed aerosol provides for a better user experience.

Figure 6:
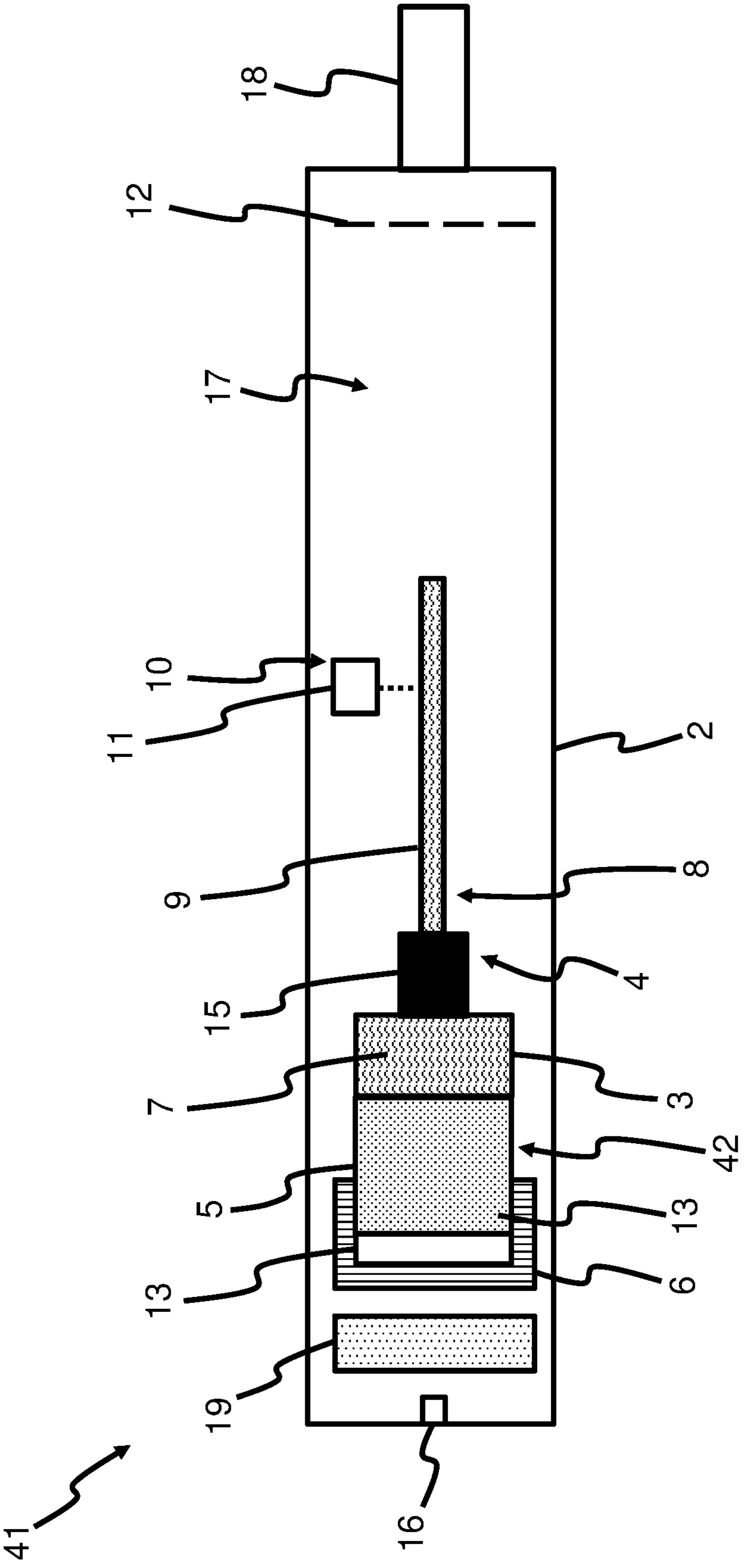
FIG. 6 shows schematically a side view of a longitudinal cross-section of an aerosol-generating device according to a fourth embodiment.

Referring to FIG. 6, there is shown schematically an example of an aerosol-generating device 41 according to a fourth embodiment. The fourth embodiment includes many of the same elements as the first embodiment, such as the housing 2, the first storage portion 3, the electrospray device 4, the second storage portion 5, the heater 6 and the voltage circuit 10. Like reference numerals are used to designate like parts.

In the example according to the fourth embodiment as shown in FIG. 6, the aerosol-generating device 41 has a cartridge 42. The cartridge 42 has a first compartment defining the first storage portion 3. The cartridge 42 has a second compartment defining the second storage portion 5. The cartridge 42 is removable from the aerosol-generating device 1. For example, a user may remove the cartridge 42 when the supply of the first liquid aerosol-forming substrate 7 in the first storage portion 3 or the supply of the second liquid aerosol-forming substrate 13 in the second storage portion 5 has been depleted.

The heater 6 in the example shown in FIG. 6 is a mesh type heater. The heater 6 may be in direct contact with at least one of the second liquid aerosol-forming substrate 13 and the liquid transfer element 14. In the example of FIG. 6, the heater 6 is in direct contact with both the second liquid aerosol-forming substrate 13 and the liquid transfer element 14.

Figure 7:
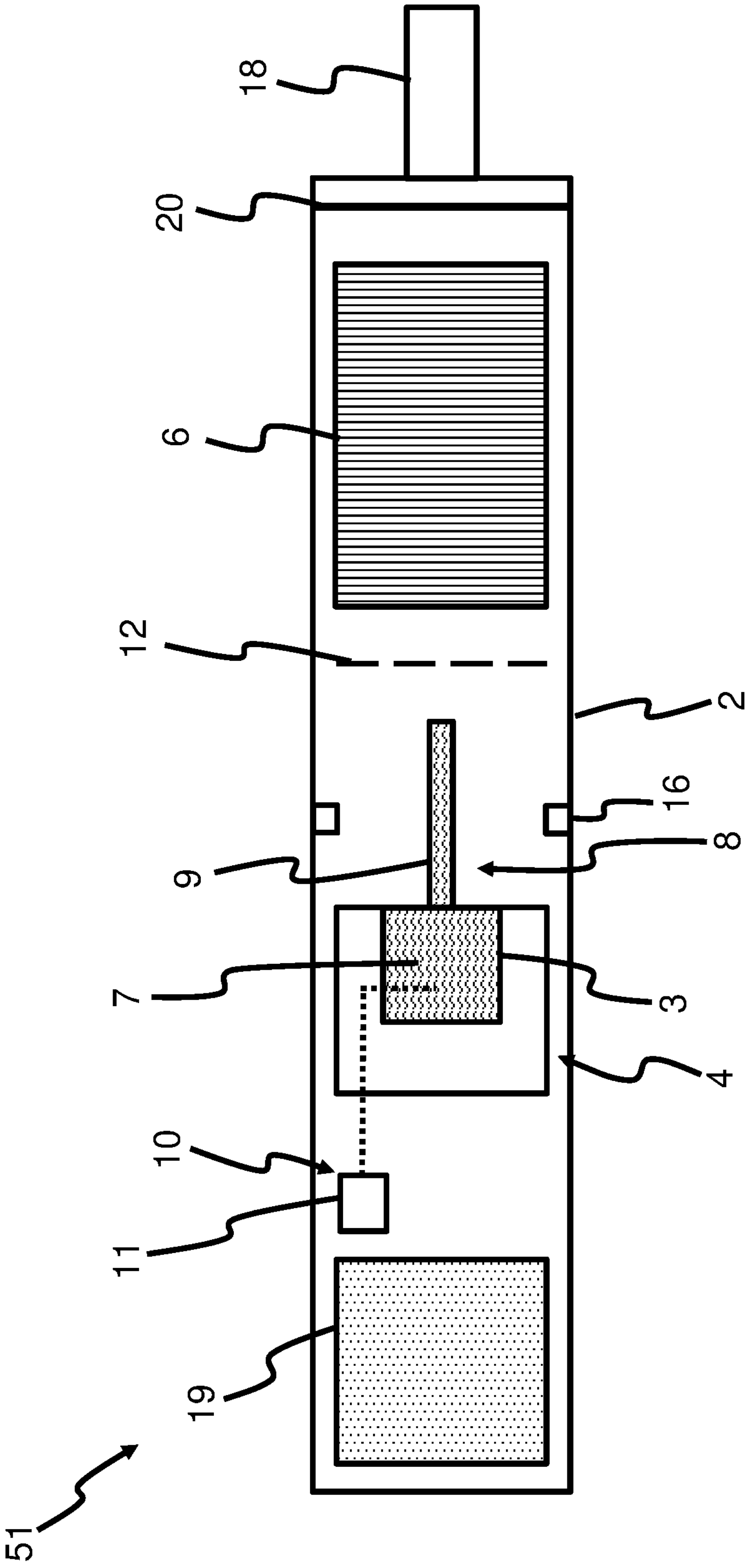
FIG. 7 shows schematically a plan view of a longitudinal cross-section of an aerosol-generating device according to a fifth embodiment.

Referring to FIG. 7, there is shown schematically an example of an aerosol-generating device 51 according to a fifth embodiment. The fifth embodiment includes many of the same elements as the first embodiment, such as the housing 2, the first storage portion 3, the electrospray device 4, the second storage portion 5, the heater 6 and the voltage circuit 10. Like reference numerals are used to designate like parts.

In the example according to the fifth embodiment as shown in FIG. 7, the voltage terminal 11 is a substrate voltage terminal. The substrate voltage terminal is arranged to be in direct contact with the first liquid aerosol-forming substrate 7. In this example, the substrate voltage terminal is inserted into the first storage portion 3 so that it comes in to contact with the first liquid aerosol-forming substrate 7. The substrate voltage terminal is thus electrically connected to the first liquid aerosol-forming substrate 7. The nozzle 9 in the example of FIG. 7 is non-conductive.

In the aerosol-generating device 51 according to the embodiment shown in FIG. 7, the voltage circuit 10 is arranged to apply the voltage difference between the substrate voltage terminal and a circuit ground. In this example, the circuit ground is the counter electrode 12.

With the example of the aerosol-generating device 51 of the fifth embodiment as shown in FIG. 7, a liquid dispensing apparatus is not required to dispense aerosol from the first storage portion 3. This is because the first aerosol that is generated from the first liquid aerosol-forming substrate is automatically ejected out of the nozzle 8 by repulsion force due to the ionisation applied to the first aerosol when it is generated by the voltage circuit 10.

Figure 8:
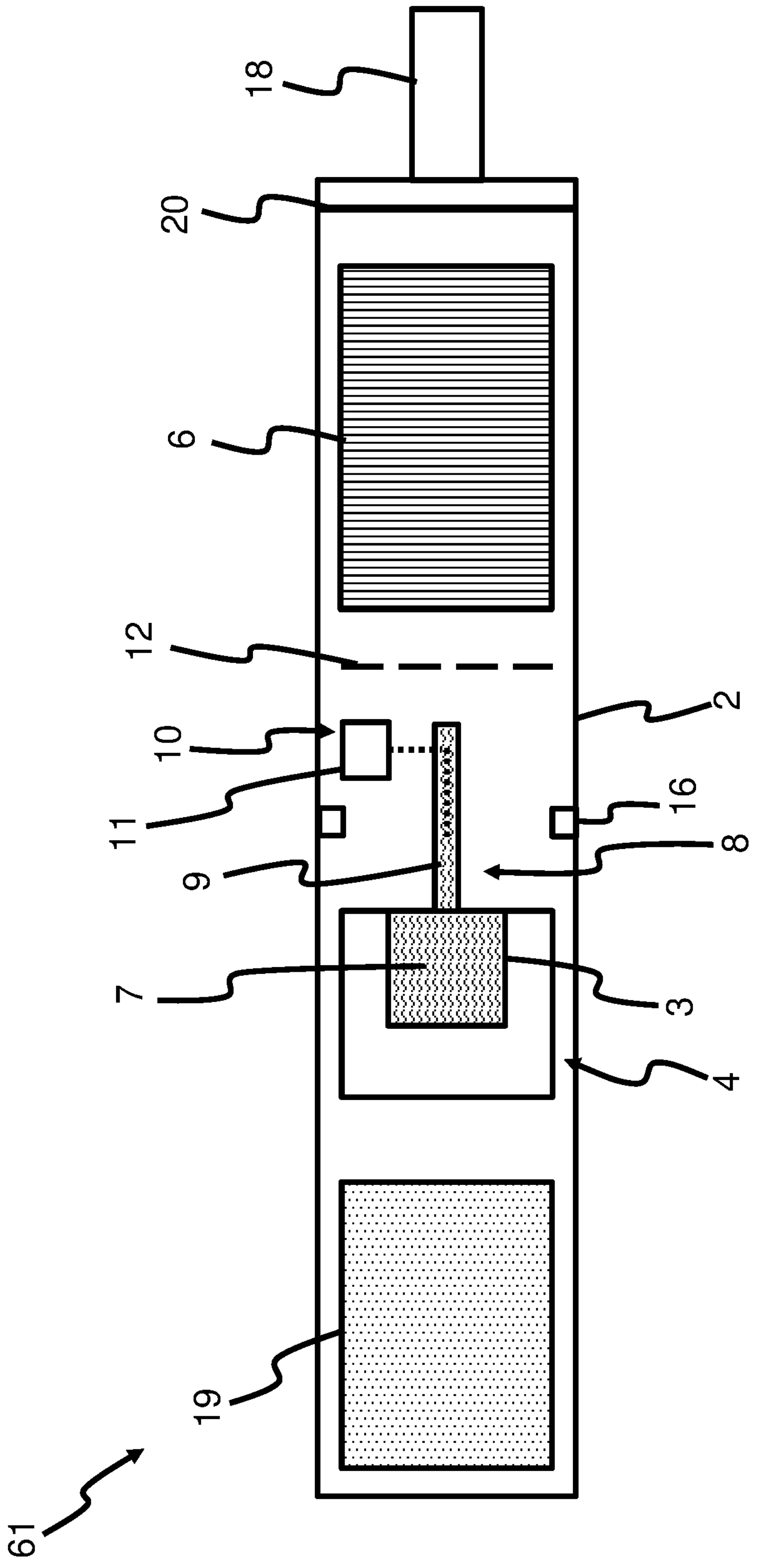
FIG. 8 shows schematically a plan view of a longitudinal cross-section of an aerosol-generating device according to a sixth embodiment.

Referring to FIG. 8, there is shown schematically an example of an aerosol-generating device 61 according to a sixth embodiment. The fourth embodiment includes many of the same elements as the first embodiment, such as the housing 2, the first storage portion 3, the electrospray device 4, the second storage portion 5, the heater 6 and the voltage circuit 10. Like reference numerals are used to designate like parts.

In the example according to the sixth embodiment as shown in FIG. 8, the voltage terminal 11 is a substrate voltage terminal. The substrate voltage terminal is arranged to be in direct contact with the first liquid aerosol-forming substrate 7. In this example, the substrate voltage terminal is inserted inside of the nozzle 9 so that it comes in to contact with the first liquid aerosol-forming substrate 7. The nozzle 9 in the example of FIG. 8 is non-conductive. The substrate voltage terminal is thus electrically connected to the first liquid aerosol-forming substrate 7. As with the fifth embodiment shown in FIG. 7, in the example of the aerosol-generating device 61 of the sixth embodiment as shown in FIG. 8, a liquid dispensing apparatus is not required.

In the aerosol-generating device 61 according to the embodiment shown in FIG. 8, the voltage circuit 10 is arranged to apply the voltage difference between the substrate voltage terminal and a circuit ground. In this example, the circuit ground is the counter electrode 12.

The exemplary embodiments described above are not intended to limit the scope of the claims. Other embodiments consistent with the exemplary embodiments described above will be apparent to those skilled in the art. Features described in relation to one embodiment may also be applicable to other embodiments.

The invention claimed is:

1. An aerosol-generating device, comprising:
- a first storage portion;
- a first liquid aerosol-forming substrate contained within the first storage portion;
- an electrospray device configured to generate a first aerosol from the first liquid aerosol-forming substrate, the electrospray device comprising:
  - a nozzle configured to receive the first liquid aerosol-forming substrate from the first storage portion, and
  - a voltage circuit comprising a circuit ground, the voltage circuit being configured to apply a voltage difference between the first liquid aerosol-forming substrate and the circuit ground;
- a second storage portion;
- a second liquid aerosol-forming substrate contained within the second storage portion;
- a heater configured to heat second liquid aerosol-forming substrate from the second storage portion; and
- a mixing chamber in fluid communication with the nozzle and the heater,
- wherein the heater is downstream of the nozzle.

2. The aerosol-generating device according to claim 1, wherein the nozzle comprises a capillary tube in fluid communication with the first storage portion.

3. The aerosol-generating device according to claim 1,
- wherein the voltage circuit further comprises a voltage terminal electrically connected to at least one of the first storage portion and the nozzle, and
- wherein the voltage circuit is further configured to apply a voltage difference between the voltage terminal and the circuit ground.

4. The aerosol-generating device according to claim 1,
- wherein the voltage circuit further comprises a substrate voltage terminal in contact with the first liquid aerosol-forming substrate, and
- wherein the voltage circuit is further configured to apply a voltage difference between the substrate voltage terminal and the circuit ground.

5. The aerosol-generating device according to claim 4, wherein the voltage circuit is further configured to apply the voltage difference of between 1 kilovolt and 20 kilovolts.

6. The aerosol-generating device according to claim 1, further comprising at least one of a mesh and a perforated plate disposed downstream of the nozzle.

7. The aerosol-generating device according to claim 6, wherein the at least one of the mesh and the perforated plate is electrically connected to the circuit ground.

8. The aerosol-generating device according to claim 1, wherein the first liquid aerosol-forming substrate comprises at least one of nicotine, glycerol, and propylene glycol.

9. The aerosol-generating device according to claim 1, further comprising a liquid dispensing apparatus configured to dispense the first liquid aerosol-forming substrate from the first storage portion to the nozzle.

10. The aerosol-generating device according to claim 1,
- wherein the second storage portion comprises a liquid transfer element, and
- wherein the second liquid aerosol-forming substrate is sorbed onto the liquid transfer element.

11. The aerosol-generating device according to claim 1, wherein the aerosol-generating device is configured to heat the heater to a temperature of between 80 degrees Celsius and 180 degrees Celsius.

12. The aerosol-generating device according to claim 1, wherein the second liquid aerosol-forming substrate comprises at least one of water, triethyl citrate, and a flavourant.

13. A method of generating a mixed aerosol by an aerosol-generating device according to claim 1, the method comprising:
- electrospraying a first liquid aerosol-forming substrate to generate a first aerosol;
- heating a second liquid aerosol-forming substrate to generate a second aerosol; and
- mixing the first aerosol and the second aerosol to generate the mixed aerosol.

14. The method according to claim 13, wherein the electrospraying the first liquid aerosol-forming substrate comprises electrospraying the first liquid aerosol-forming substrate at a voltage of between 1 kilovolt and 20 kilovolts.

15. The method according to claim 13, wherein the heating the second liquid aerosol-forming substrate comprises heating the second liquid aerosol-forming substrate to a temperature of between 80 degrees Celsius and 180 degrees Celsius.

16. The method according to claim 14, wherein the heating the second liquid aerosol-forming substrate comprises heating the second liquid aerosol-forming substrate to a temperature of between 80 degrees Celsius and 180 degrees Celsius.

* * * * *